United States Patent [19]
Popovich

[11] Patent Number: 6,082,862
[45] Date of Patent: Jul. 4, 2000

[54] IMAGE TILING TECHNIQUE BASED ON ELECTRICALLY SWITCHABLE HOLOGRAMS

[75] Inventor: Milan M. Popovich, Leicester, United Kingdom

[73] Assignee: DigiLens, Inc., Sunnyvale, Calif.

[21] Appl. No.: 09/388,994

[22] Filed: Sep. 2, 1999

Related U.S. Application Data

[60] Provisional application No. 60/104,605, Oct. 16, 1998.

[51] Int. Cl.[7] ....................................................... G02B 5/32
[52] U.S. Cl. ............................. 353/30; 353/94; 353/122; 359/15; 359/22; 359/23
[58] Field of Search .................................. 353/7, 14, 30, 353/31, 32, 34, 94, 122; 359/12, 15, 16, 32, 634, 22, 23, 24, 33; 348/40, 41, 218, 744

[56] References Cited

U.S. PATENT DOCUMENTS

| | | | |
|---|---|---|---|
| 4,372,639 | 2/1983 | Johnson | 350/3.7 |
| 4,923,771 | 5/1990 | Cosner | 430/1 |
| 4,984,179 | 1/1991 | Waldern | 364/514 |
| 5,046,793 | 9/1991 | Hockley et al. | 359/12 |
| 5,404,234 | 4/1995 | Taniguchi et al. | 359/15 |
| 5,698,343 | 12/1997 | Sutherland et al. | 430/1 |
| 5,745,203 | 4/1998 | Valliath et al. | 349/113 |
| 5,796,499 | 8/1998 | Wenyon | 359/15 |
| 5,801,793 | 9/1998 | Faris et al. | 349/5 |
| 5,825,448 | 10/1998 | Bos et al. | 349/128 |
| 5,942,157 | 8/1999 | Sutherland et al. | 252/582 |

FOREIGN PATENT DOCUMENTS

| | | | |
|---|---|---|---|
| WO 97/35223 | 9/1997 | WIPO | G02B 27/01 |
| WO 98/04650 | 2/1998 | WIPO | C09K 19/00 |

*Primary Examiner*—Safet Metjahic
*Assistant Examiner*—E P LeRoux
*Attorney, Agent, or Firm*—Law Offices of Terry McHugh; Thomas H. Ham

[57] ABSTRACT

A projection system and a method displaying a high resolution composite image on a projection screen include a number of reconfigurable holographic optical elements (HOEs) in the projection optics of the system. The reconfigurable HOEs of the projection optics allow the system to direct multiple image segments of the composite image that are projected from a single image source toward different regions of the projection screen to form the composite image on the screen. The image segments have a high resolution due to the fact that they have been magnified by a relatively small degree. Consequently, the displayed composite image formed by the image segments has an equally high resolution. Each reconfigurable HOE includes a hologram that is sandwiched between two electrode layers. The hologram is a holographic photopolymeric film that has been combined with liquid crystal. The hologram has an optical property that changes in response to an applied electrical field. The reconfigurable HOEs of the projection optics operate to selectively diffract the image segments projected from an image generator to different regions of the projection screen when enabled to a diffractive state. The image segments that are diffracted by the projection optics produce the composite image on the projection screen.

21 Claims, 6 Drawing Sheets

IMAGE TILING TECHNIQUE BASED ON ELECTRICALLY SWITCHABLE HOLOGRAMS

This application claims the benefit of U.S. Provisional Application No. 60/104,605, filed Oct. 16, 1998.

TECHNICAL FIELD

The invention relates generally to projection systems and more particularly to a projection system having holographic optical elements.

DESCRIPTION OF THE RELATED ART

Projection systems operate to display an image or a sequence of images by projecting the image(s) onto a screen. These systems tend to be designed for multiple viewers and usually require the projection screen to have a large viewing area in order to achieve large fields of view at comfortable viewing distances. The projected images vary in size, depending on the particular projection system. For example, projection systems that are used in theaters are able to display projected images that are extremely large, while projection systems that are used in offices for presentations are typically limited to much smaller projected images.

With reference to FIG. 1, an exemplary prior art projection system 10 is shown. The projection system 10 includes a projector 12 and a projection screen 14. The projector and the screen operate to display a color image formed by projecting three monochromatic image components of the color image onto the screen. The projector 12 is comprised of an image generator 16 and projection optics 18. The image generator 16 contains a light source 20 that provides white illumination light to an input image display panel 22. As an example, the input image display panel 22 may be a reflective liquid crystal display (LCD) panel which is illuminated by the light from the light source. The display panel generates the image components that are to be projected onto the screen.

The image generator 16 also includes a color filter 24 that is positioned between the light source 20 and the display panel 22. The color filter 24 operates to pass only a selected portion of the illumination light, with the selected portion having a particular wavelength band. The color filter is designed to sequentially transmit tristimulus color components, i.e., red, blue and green lights. Typically, the color filter is a rotating disc having three transparent regions. These regions contain pigments to filter the illumination light based on wavelength. The rotation of the disc allows alternating colors to be sequentially transmitted through the disc. When light of a particular wavelength band impinges upon the display panel 22, an input image component corresponding to that particular wavelength band is displayed on the display panel 22. The image component is then projected toward the projection screen 14 through the projection optics 18. This process is repeated for the other two colors. The sequential projection of the input image components that correspond to the tristimulus color lights allows the displayed image on the projection screen to appear to be in color, due to fusion of the three image components within the eye integration time. The size of the displayed image on the projection screen is primarily determined by the projection optics 18 and the distance between the projection optics and the projection screen.

The projection optics 18 includes one or more zooming lenses (not shown) to magnify the projected image components from the image generator 16. The zooming lenses are variable focus lenses, which allow user control of image magnification. These zooming lenses are selectively repositioned within the projection optics to provide specific magnification powers. The projection optics may also include one or more focusing lenses (not shown) to focus the projected image on the screen 14. The projection screen may be configured for "reflective viewing," i.e., viewing from the side of the projection screen facing the projector 12, or for "transmissive viewing," i.e., viewing from the side of the projection screen opposite to the projector.

A concern with convention projection systems, such as the projection system 10, is that the resolution of the displayed image is dependent on the magnification of the projected image. With greater magnification, the resolution of the displayed image deteriorates in response to the increased magnification. In addition, the optical elements that are typically used in conventional projection systems tend to be bulky, increasing the overall size of the system.

Therefore, what is needed is an efficient projection system having a compact optical configuration that can display images that combine high magnification and high resolution.

SUMMARY OF THE INVENTION

A projection system and a method of displaying a high resolution composite image on a projection screen utilize a number of reconfigurable holographic optical elements (HOEs) in the projection optics of the system. The reconfigurable HOEs of the projection optics allow the system to segment an image that is projected from a single image source and to direct the segments toward adjacent regions of the projection screen, where the segments are generated using temporally separated images from the single image source. The segments are arranged to form the composite image on the screen. The image segments have a high resolution, since they have been magnified by a relatively small degree. Consequently, the displayed composite image formed by the image segments has an equally high resolution.

The reconfigurable HOEs of the projection optics may be designed to perform simple optical functions that are commonly associated with traditional optical devices, such as those performed by lenses, prisms and mirrors. However, the reconfigurable HOEs are also designed to perform sophisticated optical manipulations, such as varying the light intensity with respect to a specific direction. Depending on the optical characteristics of the reconfigurable HOEs, the projection screen of the system may be designed for "reflective viewing," i.e., viewing from the side of the projection screen facing an image generator, or for "transmissive viewing," i.e., viewing from the side of the screen opposite to the image generator.

Each reconfigurable HOE includes a hologram that is sandwiched between two electrode layers. The hologram is a holographic photopolymeric film that has been combined with liquid crystal. The presence of the liquid crystal allows the hologram to exhibit optical characteristics that are dependent on an applied electrical field. Preferably, the hologram is a Bragg-type hologram, having a high diffraction efficiency. The electrode layers may be made of Indium Tin Oxide (ITO), which typically has a transmission efficiency of greater than 80%.

The reconfigurable HOE has at least two optical operating states, a diffractive state and a passive state. The diffractive properties of the reconfigurable HOE primarily depend on the recorded holographic fringes in the photopolymeric film. In the diffractive state, the reconfigurable HOE diffracts propagating light in a predefined manner. In the passive state, the reconfigurable HOE does not optically alter the propagating light. Initially, the hologram of the reconfigurable HOE is in the diffractive state, such that received light is diffracted in the predefined manner. However, when an electrical field is generated in the hologram by applying voltage to the electrode layers of the reconfigurable HOE, the operating state of the hologram switches from the diffractive state to the passive state.

In a first embodiment of the invention, the projection system includes an image generator, projection optics, and a projection screen. The image generator and the projection screen may be conventional components. However, unlike a conventional projection optics, the projection optics of the system contains a number of reconfigurable HOEs. The projection optics includes four reconfigurable HOE stacks in which each stack is comprised of three reconfigurable HOEs. Each of the reconfigurable HOE stacks is holographically configured to diffract one of the image segments to one of four regions of the projection screen. As an example, the reconfigurable HOE stacks may be configured to selectively diffract the image segments to quadrant-like regions on a viewing surface of the screen. In addition, the reconfigurable HOE stacks may be designed to magnify the diffracted image segments by a predetermined power.

In operation, the image generator sequentially generates and projects four image segments to be displayed. Depending on the image segment being projected, one of the reconfigurable HOE stacks of the projection optics is enabled to an active mode to diffract that image segment to a corresponding region of the screen. The other reconfigurable HOE stacks of the projection optics are set to be optically passive to the projected image segment. In this fashion, the four image segments are consecutively diffracted to the different regions of the screen in synchronization with the sequenced projection of the image segments by the image generator. The four image segments diffracted by the projection optics are sequentially displayed on the projection screen. With a sufficiently fast display rate, the sequentially displayed image segments will appear as a composite image, due to fusion of the image segments within the eye integration time.

In order to display a color composite image, for each of the four image segments, three color components of the image segment are sequentially projected and displayed in the corresponding region of the screen. The three color components correspond to the tristimulus colors, i.e., red, blue and green. The three reconfigurable HOEs in each stack of the projection optics are color-specific to independently operate on the three color components. Consequently, the three reconfigurable HOEs in each stack can be categorized as red, blue and green reconfigurable HOEs. For each image segment, the image generator sequentially generates and projects the three color components of the image segment toward the screen through the projection optics. In response, a reconfigurable HOE stack of the projection optics is enabled to the active mode to diffract the three color components to the corresponding region of the screen. When the red color component of the first image segment is generated and projected by the image generator, the red reconfigurable HOE of the first enabled stack is set to the diffractive state to optically manipulate the red color component. When the blue color component is generated and projected, the blue reconfigurable HOE of the same stack is set to the diffractive state to optically manipulate the blue color component. Similarly, the green reconfigurable HOE of the first enabled stack is set to the diffractive state when the green color component of the first image segment is generated and projected by the image generator. These color components are sequentially displayed on the same region of the projection screen. With a sufficiently fast display rate, the image segment formed by the sequentially displayed color components will appear to be in color, due to fusion of the three image components within the eye integration time. As a result, the composite image that is formed by the four individual image segments will also appear to be in color.

Although the projection optics includes only four reconfigurable HOE stacks that are associated with four regions of the screen, the projection system can be modified to accommodate additional reconfigurable HOE stacks in the projection optics. The additional reconfigurable HOE stacks will allow the projection system to increase the number of image segments that will form the composite image, thereby decreasing the size of the image segments. With decrease in the size of the image segments, the resolution of the displayed composite image is further improved. However, if an increase or maintenance of resolution is not important, this technique could be used simply to increase the area of the projected image (or the field of view).

In a second embodiment of the invention, the projection optics includes two sets of four reconfigurable HOE stacks that are positioned in series. In operation, a pair of reconfigurable HOE stacks, one from each set, is enabled to optically manipulate the color components of a particular image segment. In essence, the optical functions performed by a single reconfigurable HOE stack of the projection optics in the system in accordance with the first embodiment are performed by the pair of reconfigurable HOE stacks of the projection optics in this second embodiment. Consequently, when a particular color component of an image segment is generated and projected by the image generator, two reconfigurable HOEs, one from each of the stack pair, that correspond to the particular color component are both set to the diffractive state to direct the color component to the associated region of the projection screen. The utilization of the two reconfigurable HOEs to diffract a single color component tends to be more efficient in optical terms, since the additional reconfigurable HOE can be used to correct chromatic dispersions and other aberrations introduced by the first reconfigurable HOE. Similar to the projection system in accordance with the first embodiment, the projection system in accordance with the second embodiment may be modified to accommodate additional reconfigurable HOE stacks in the projection optics. The additional reconfigurable HOE stacks will allow the projection system to form the composite image by displaying smaller image segments, resulting in a higher resolution of the displayed composite image.

In both embodiments, the projection system can be further modified to include one or more imaging devices, such as a camera having image detection capability. The imaging devices operate to image the head and the eyes of a viewer to establish the viewer's eye gaze direction. The determination of the viewer's eye gaze direction is utilized to identify which region or regions of the projection screen require updates with new image information. Since only the identified region or regions need to be refreshed with new image information, the image processing performed by the projection system can be significantly reduced.

DETAILED DESCRIPTION

Figure 1:
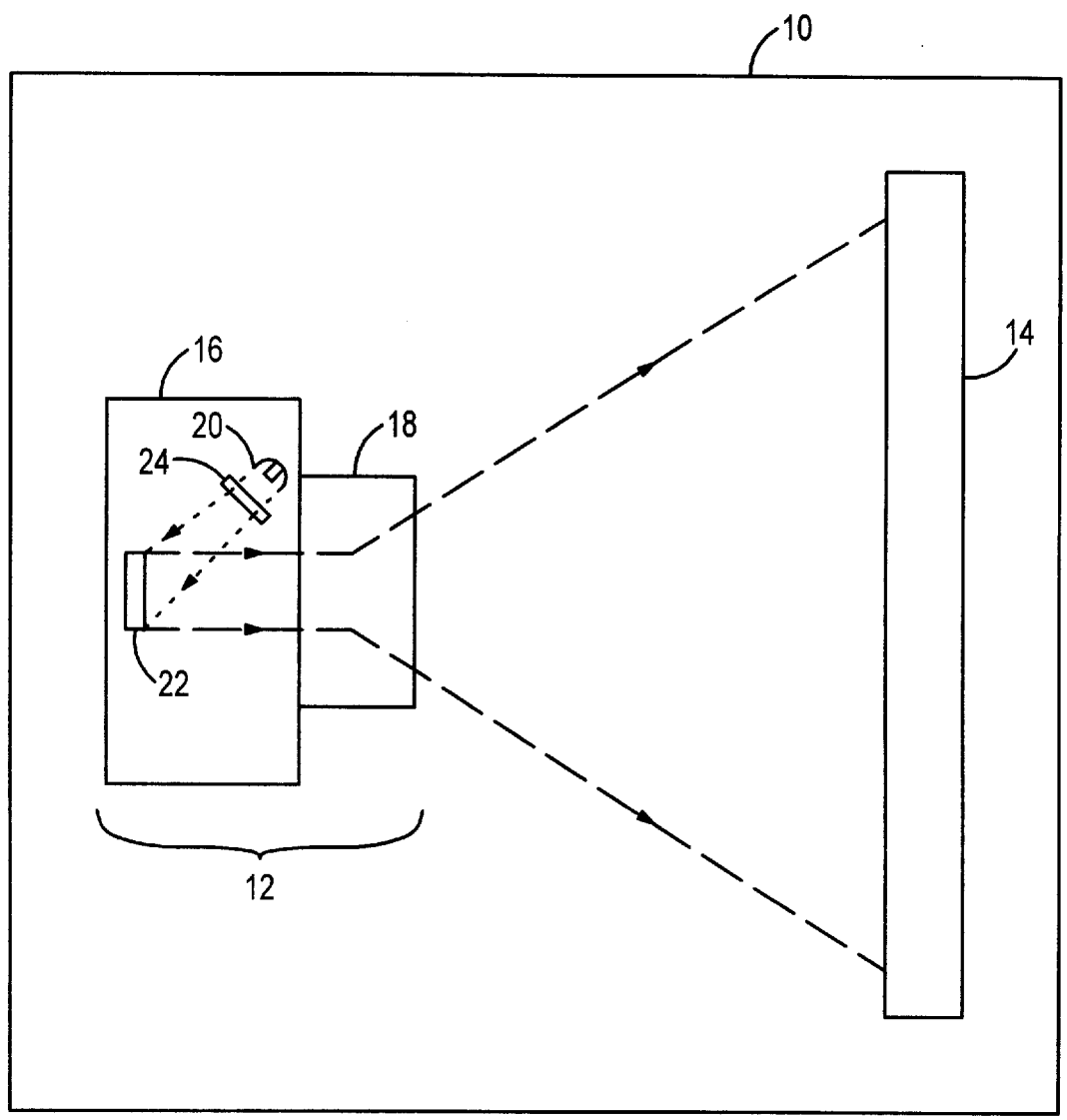
FIG. 1 is a schematic diagram of an exemplary prior art projection system.
Figure 2:
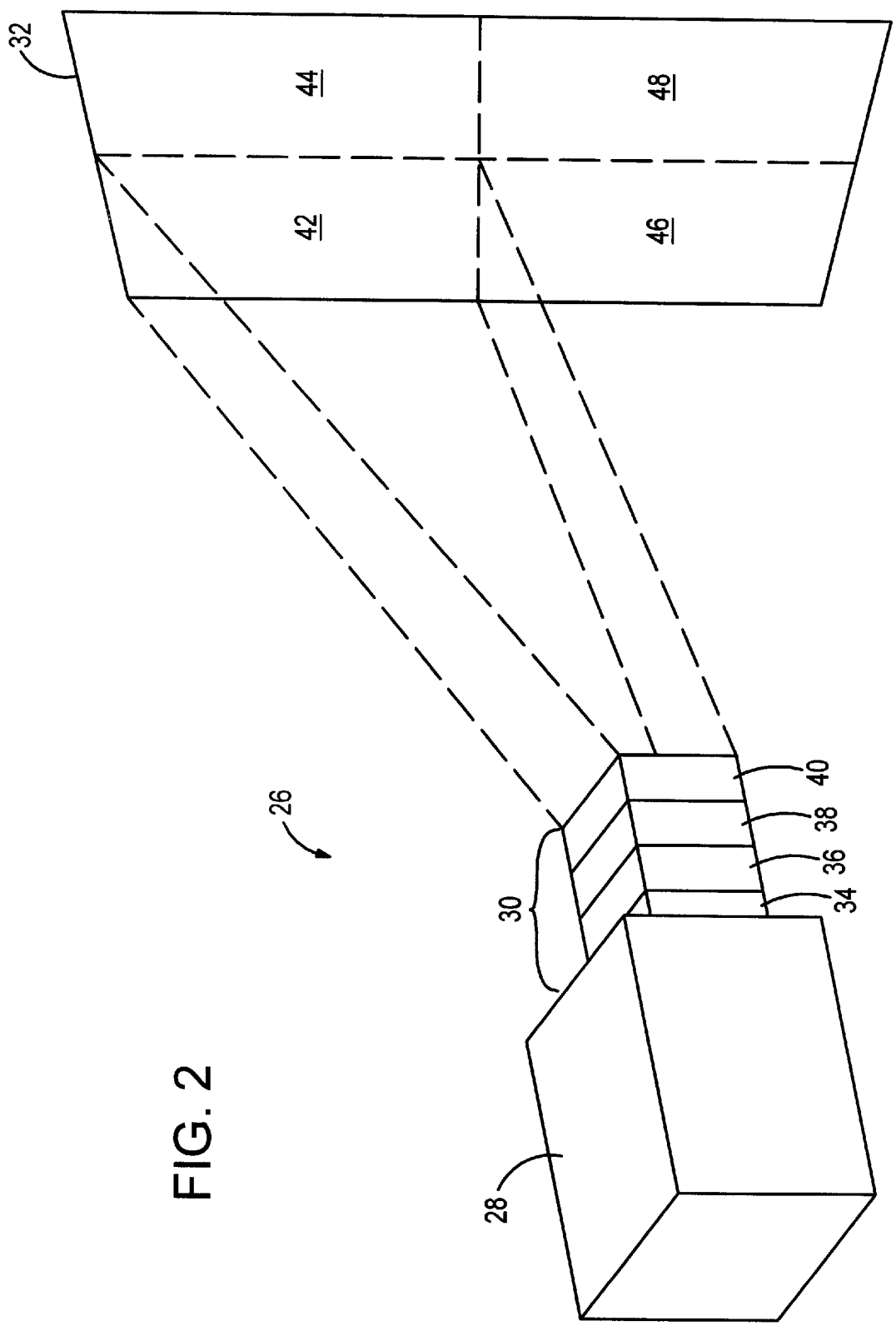
FIG. 2 is a schematic diagram of a projection system in accordance with a first embodiment of the present invention.

With reference to FIG. 2, a projection system 26 in accordance with a first embodiment of the present invention is shown. The projection system operates to display an output image in a higher resolution than conventional projection systems, such as the prior art projection system 10 of FIG. 1. This enhanced resolution is achieved by displaying the output image as a composite image made up of image segments or "image tiles." The system 26 projects multiple image segments that have been magnified by a relatively small degree to display the output image at a given size, rather than projecting a single image that has been greatly magnified to display the same sized output image. Since the resolution of a displayed image is higher for an image that has been magnified by a lesser power, each image tile has a higher resolution than the image displayed on the conventional projection systems. Moreover, the composite image displayed on the system 26 has the same high resolution as the image tiles that form the composite image.

The system 26 includes an image generator 28, projection optics 30 and a projection screen 32. The image generator 28 may be a conventional image generator, such as the image generator 16 of the prior art system 10. The projection screen may also be a conventional screen that is utilized in prior art projection systems. The projection screen can be configured for transmissive viewing or reflective viewing. However, the projection screen will be described herein as a transmissive viewing screen.

The projection optics 30 includes what will be referred to as "reconfigurable holographic optical elements" (HOEs). Similar to conventional HOEs, these reconfigurable HOEs can perform functions typically associated with traditional optical elements, as well as more sophisticated optical manipulations. However, the reconfigurable HOEs can alter their optical properties when an electrical field is applied.

The reconfigurable HOE includes a hologram that is sandwiched between two electrode layers. The hologram is preferably a Bragg-type hologram, having a high diffraction efficiency. The hologram is a holographic photopolymeric film that has been combined with liquid crystal. As an example, the photopolymeric film may be composed of a polymerizable monomer having dipentaerythritol hydroxypentacrylate, as described in PCT Application No. PCT/US97/12577 by Sutherland et al. The liquid crystal may be suffused into the pores of the photopolymeric film. The holographic fringes may be recorded into the photopolymeric film either prior to or after being combined with the liquid crystal. In the preferred embodiment, the photopolymeric material is combined with the liquid crystal prior to a recording. In this preferred embodiment, the liquid crystal and the polymer material are pre-mixed and the phase separation takes place during the recording of the hologram, such that the holographic fringes become populated with a high concentration of liquid crystal droplets. This process can be regarded as a "dry" process, which is advantageous in terms of mass production of the reconfigurable HOEs.

Recording of the hologram can be accomplished by a traditional optical process in which interference fringes are created by applying beams of light. Alternatively, the interference fringes may be artificially created by using highly accurate laser writing devices or other optical replication techniques. The electrode layers that are adjacent to the hologram are made of a transparent conductive material. As an example, the electrode layers may be made of Indium Tin Oxide (ITO), which usually has a transmission efficiency of greater than 80%. An electrical field is generated within the hologram when a potential difference is applied to the layers.

The reconfigurable HOE has at least two optically operating states, a diffractive state and a passive state. The optical properties of the reconfigurable HOE primarily depend on the recorded holographic fringes in the photopolymeric film. In the diffractive state, the reconfigurable HOE diffracts propagating light in a predefined manner. In the passive state, the reconfigurable HOE does not optically alter the propagating light. Initially, the hologram of the reconfigurable HOE is in the diffractive state, such that received light is diffracted in the predefined manner. However, when an electrical field is created in the hologram by applying voltage to the electrode layers of the reconfigurable HOE, the optical state of the hologram switches from the diffractive state to the passive state.

The projection optics 30 of the system 26 includes four reconfigurable HOE stacks 34, 36, 38 and 40. Each stack contains three reconfigurable HOEs. In order to describe the diffracting characteristics of the stacks in the projection optics, the viewing surface of the screen 32 has been illustratively partitioned into regions 42, 44, 46 and 48. Each reconfigurable HOE stack of the projection optics is operatively associated with a particular region of the screen. The reconfigurable HOE stack 34 is designed to selectively diffract image segments projected from the image generator 28 to the region 48. Similarly, the reconfigurable HOE stacks 36, 38 and 40 are configured to selectively diffract the projected image segments to the regions 46, 44 and 42, respectively. In addition, the reconfigurable HOE stacks of the projection optics may be designed to magnify the projected image segments by a predetermined power. The reconfigurable HOE stacks operate one-by-one in a sequential manner to direct the projected image segments to the different regions of the screen, such that a composite image made up of the projected image segments is displayed on the screen in a high resolution.

Figure 3:
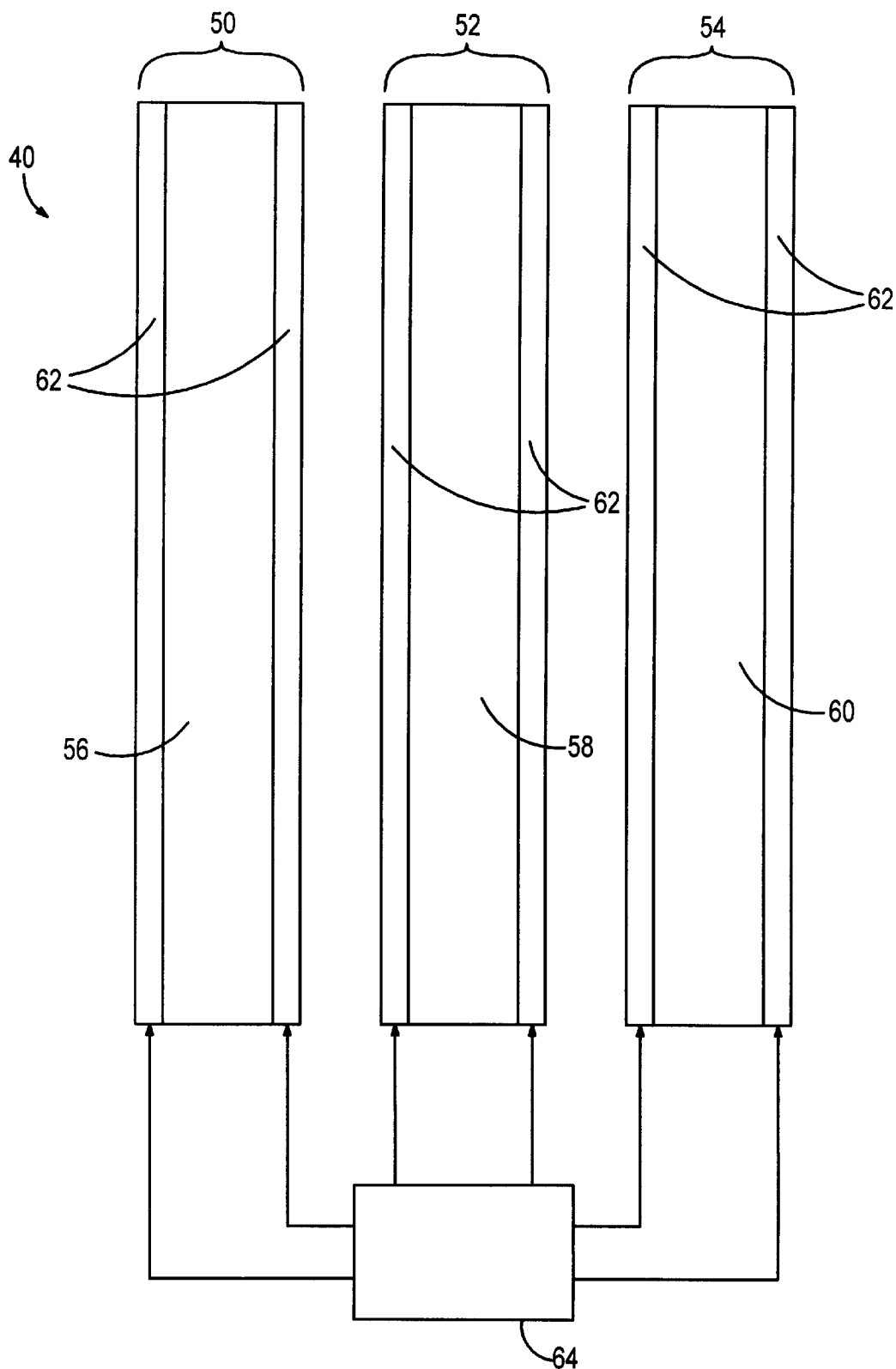
FIG. 3 is a schematic diagram of the components of an exemplary reconfigurable holographic optical element stack included in the projection optics of the system of FIG. 2.

Structurally, the stacks 34–40 are-essentially identical, except for the interference fringes recorded in the reconfigurable HOEs of the stacks. Therefore, only one of the stacks (i.e., the stack 40) will be described in detail. In FIG. 3, the components of the reconfigurable HOE stack 40 are shown. The stack 40 includes three reconfigurable HOEs 50, 52 and 54. The reconfigurable HOE 50 includes a hologram 56 that is sandwiched between two electrodes 62. Similarly, the reconfigurable HOE 52 includes a hologram 58 between a pair of electrodes 62 and the reconfigurable HOE 54 includes a hologram 60 between another pair of electrodes 62. Each hologram is recorded with a fringe pattern which gives rise to a diffracting characteristic that directs projected image segments to region 42 of the screen 32. However, each hologram is also configured such that only light of a particular monochromatic wavelength band is diffracted by the hologram, so that an image segment is transmitted in its three separated color components. The hologram 56 is dedicated to operate on red light. The hologram 58 is configured to only operate on green light, while the hologram 60 is specific to blue light.

The electrodes 62 of the reconfigurable HOEs 50–54 are individually coupled to a voltage controller 64. The voltage controller selectively provides an excitation signal to the electrodes of a selected reconfigurable HOE, switching the hologram of that reconfigurable HOE from the diffractive state to the passive state. The hologram in the passive state can then be switched to the diffractive state by removing the voltage to the electrodes.

In operation, the image generator 28 of FIG. 2 sequentially generates and projects four color sets of monochromatic image components through the projection optics 30. Each color set includes three monochromatic image components that correspond to the tristimulus colors, i.e., red, blue and green. The three image components will form a single color image segment that will be displayed on one of the regions 42–48 of the screen 32. The projection optics 30 operates in conjunction with the image generator to direct the color sets of image components to appropriate regions of the screen by allowing only the corresponding reconfigurable HOE stack to diffract a color set of image components. For example, in order to display a color image segment on the region 42 of the projection screen, only the reconfigurable HOE stack 40 is enabled to optically manipulate the projected image components. The reconfigurable HOE stacks 34–38 are set to be optically passive to transmitting light. The three reconfigurable HOEs 50–54 of the stack 40 are selectively activated and deactivated in chromatic and temporal synchronization with the projection of the image components by the image generator to sequentially diffract the projected image segments to the region 42 of the screen. For example, when the image generator projects a red monochromatic image component, only the reconfigurable HOE 50 of the stack 40 that optically operates on red color light is enabled to the diffractive state, while the other two reconfigurable HOEs 52 and 54 of the stack are enabled to the passive state. In the diffractive state, the reconfigurable HOE 50 of the stack directs the projected red image component to the region 42 of the projection screen. By sequentially transmitting the image components that correspond to different tristimulus colors from the image generator, a faithful color composite image segment is displayed on the region 42 of the projection screen.

A second color image segment can be displayed on one of the remaining regions 44–48 of the projection screen 32 by selecting a corresponding reconfigurable HOE stack 34, 36 or 38 to operate on the next color set of image components that are generated and projected by the image generator 28. For example, the second color image segment can be displayed on the region 44 by disenabling the stack 40 to be optically passive and enabling the reconfigurable HOEs of the stack 38 to transmit the image components of the second color image segment to the region 44. The first color image segment displayed on the region 42 and the second color image segment subsequently displayed on the region 44 will appear to be simultaneously displayed due to fusion of the image segments within the eye integration time, if the display rate is sufficiently fast. With a faster display rate, four different color image segments can appear to be "simultaneously" displayed on the four regions 42–48 of the projection screen to produce a composite color image.

In a more complex embodiment, the projection optics 30 may include additional reconfigurable HOE stacks to display a composite image formed by a greater number of image segments. These image segments may be smaller in size to increase the overall resolution of the composite image. As an example, the projection optics may include a total of sixteen reconfigurable HOE stacks for displaying a single composite image comprised of sixteen color image segments in a 4×4 configuration. The number of reconfigurable HOE stacks included in the projection optics is not critical to the invention. Furthermore, the reconfigurable HOE stack of the projection optics may have different magnifying characteristics, such that the displayed image segments are enlarged by various degrees.

Figure 4:
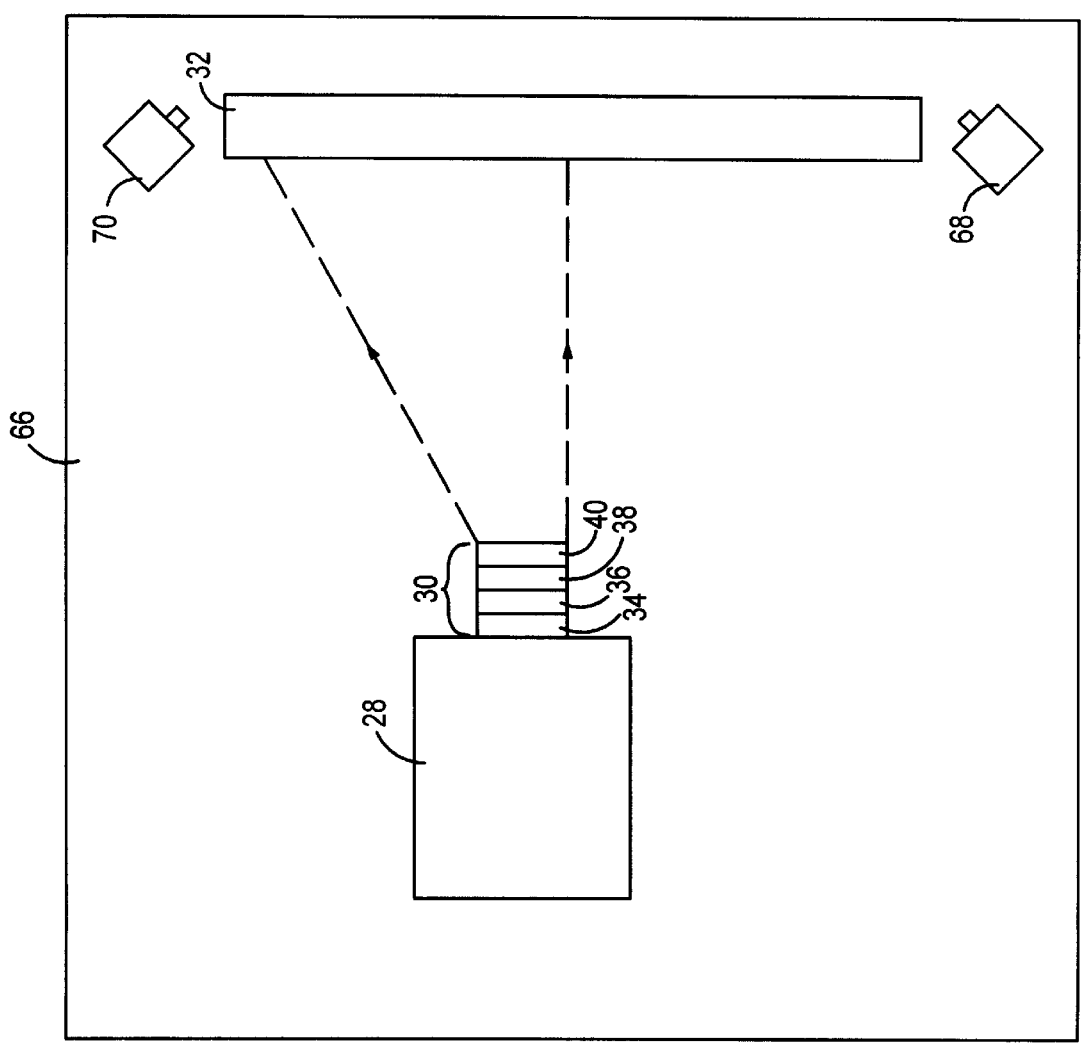
FIG. 4 is a schematic diagram of a modified projection system of FIG. 2 with imaging devices.

Turning to FIG. 4, a projection system 66, which is a modified version of the system 26 of FIG. 2, is shown. The same reference numerals of FIG. 2 will be used for the same components illustrated in FIG. 4. The projection system 66 includes all the components of the projection system 26, including the projection optics 30. However, the projection system 66 further includes two imaging devices 68 and 70. The imaging devices may be cameras having image recognition capability.

In general, the projection system 66 operates similarly to the projection system 26 to display a composite image on the projection screen 32. As stated above, the composite image is formed by sequentially displaying image segments of the composite image on the regions 42–48 of the projection screen. To display a continuously changing composite image on the projection screen, each image segment of a composite image must be updated and displayed. Such a process can be computationally intensive with respect to image processing, especially if the number of image segments that are displayed by the system to form the composite image is large. The projection system 66 operates to alleviate some of this processing burden by implementing a moving viewable area of interest (AOI). The term "area of interest" is defined herein as a field of view region centered on a position of the projection screen targeted by a viewer. The AOI can be determined by the eye gaze direction of the viewer. By tracking the eye gaze direction of the viewer, only image segments that are currently within the AOI or about to be within the AOI can be updated.

The imaging devices 68 and 70 operate to image the head and the eyes of a viewer 72 to establish the viewer's eye gaze direction. The imaging devices can be separate components of the projection system 66, as shown in FIG. 4. In an alternative configuration, the imaging devices may be incorporated into the projection optics 30, as described in U.S. Provisional Application No. 60/094,522, entitled "Holographic Integrated Display and Imaging System," filed on Jul. 8, 1998. The imaging devices can utilize various known imaging techniques to capture the position of the head and the eyes of the viewer for determining the viewer's eye gaze direction. For example, each of the imaging devices may include a light-emitting element to radiate imaging light, such as infra-red light, to the head and the eyes of the viewer and a light sensor to receive the back-scattered light for imaging. A known image processing technique can then be utilized to determine the viewer's eye gaze direction.

The determination of the viewer's eye gaze direction is utilized to identify which region or regions 42–48 of the projection screen 32 require recurring updates by calculating the fixated viewing point of the viewer 72. The remaining regions of the projection screen are displayed with the previous image segments. The resolution of these remaining image segments may be lowered to further decrease the required signal processing. Using a suitable algorithm to predict the trajectory of a moving viewing point, the region 42, 44, 46 or 48 that will be entered by the gaze of the viewer 72 can be updated just prior to entry. In order to avoid any ambiguities at the adjacent boundaries of the regions, the image segments displayed on the regions should overlap into portions of the adjoining regions.

Figure 5:
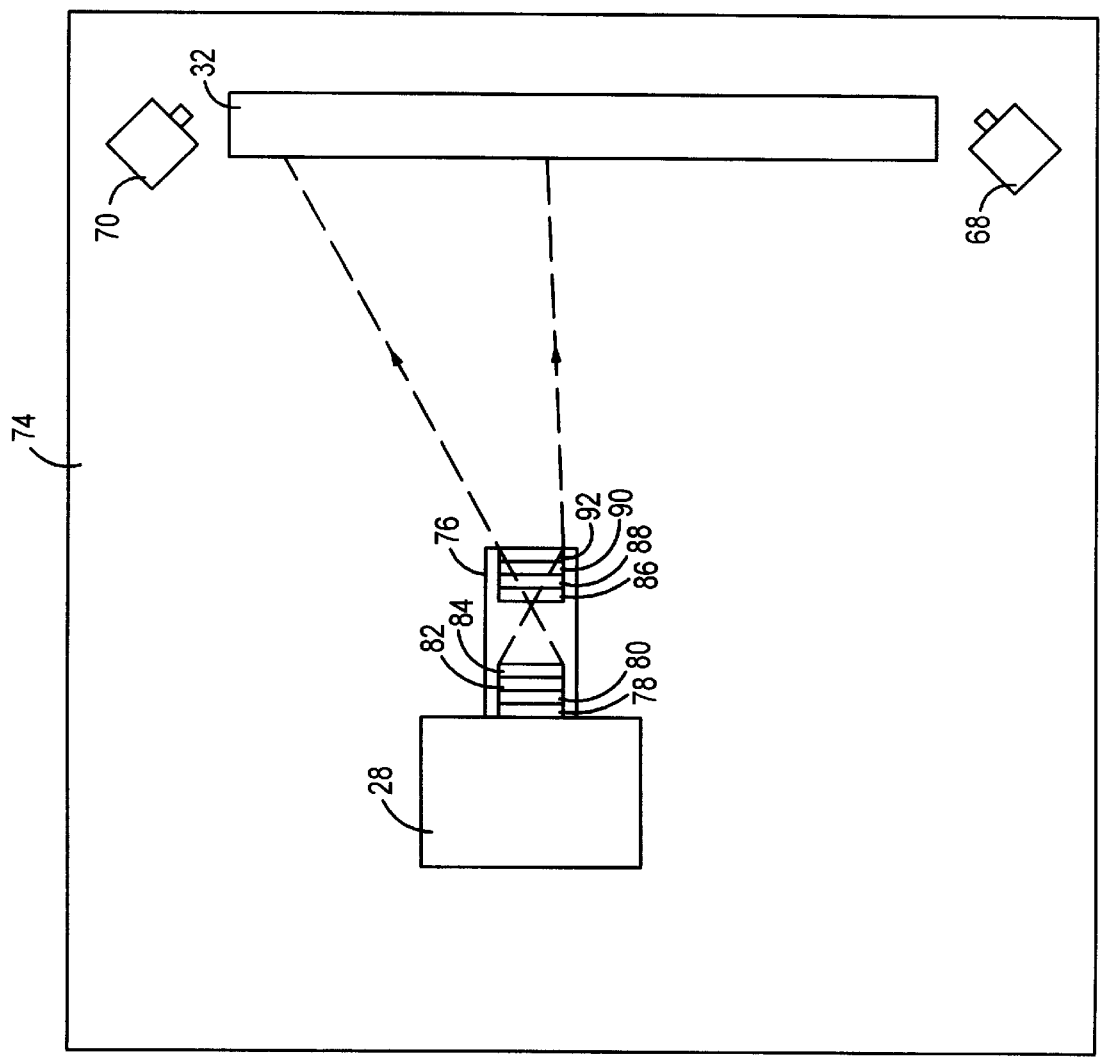
FIG. 5 is a schematic diagram of a projection system in accordance with a second embodiment of the invention

With reference to FIG. 5, a projection system 74 in accordance with a second embodiment of the invention is shown. The same reference numerals of FIG. 2 will be used for the same components illustrated in FIG. 5. The system 74 includes the image generator 28 and the screen 32 that were also included in the system 26 of FIG. 2. The system 74, however, includes projection optics 76, which is structurally different than the projection optics 30 of the system 26. Nevertheless, the projection optics 76 operationally functions in an identical manner as the projection optics 30. Therefore, the overall operation of the projection system 74 is identical to the operation of the projection system 26.

The projection optics 76 of the system 74 includes a first set of reconfigurable HOE stacks 78, 80, 82 and 84 and a second set of reconfigurable HOE stacks 86, 88, 90 and 92. Similar to the reconfigurable HOE stacks 34–40 of the projection optics 30, each of the reconfigurable HOE stacks 78–92 includes three reconfigurable HOEs that are holographically configured to selectively manipulate red, blue or green image components projected from the image generator 28. However, unlike the projection optics 30, the reconfigurable HOE stacks 78–92 of the projection optics 76 operate in pairs to direct the monochromatic image components to the regions 42–48 of the screen 32. The reconfigurable HOE stack 84 operates in conjunction with the reconfigurable HOE stack 92 to direct the monochromatic image components to the region 42 of the screen. Similarly, the reconfigurable HOE stacks 78 and 86, 80 and 88, and 82 and 90 operate in pairs to direct the image components to the regions 48, 46 and 44, respectively.

In operation, the image generator 28 sequentially generates and projects four color sets of monochromatic image components through the projection optics 76. During a period when the image generator projects a color set of image components that is to be displayed in the region 42 of the projection screen 32, only the reconfigurable HOE stacks 84 and 92 of the projection optics are enabled to optically manipulate the image components. When a red image component of the color set is projected, the reconfigurable HOE of the stack 84 and the reconfigurable HOE of the stack 92 that are configured to operate on red light are enabled to the diffractive state to diffract the red image component to the region 42. The two reconfigurable HOEs operate much like two lenses that are positioned in series to manipulate propagating images. In essence, the two reconfigurable HOEs of the stacks 84 and 92 perform the function of the reconfigurable HOE 50 of the stack 40 in the projection optics 30. However, the utilization of the two reconfigurable HOEs to diffract a single monochromatic image tends to be more efficient in optical terms, since the additional reconfigurable HOE (i.e., the reconfigurable HOE of the stack 92) can be used to correct chromatic dispersions and other aberrations introduced by the first reconfigurable HOE (i.e., the reconfigurable HOE of the stack 84). In a similar manner, the blue and green image components projected from the image generator are diffracted to the region 42 of the screen by the chromatically corresponding reconfigurable HOEs of the stacks 84 and 92.

During a period when the image generator projects a color set of image components that is to be displayed in the region 44 of the projection screen 32, only the reconfigurable HOE stacks 82 and 90 of the projection optics 76 operate to optically manipulate the image components. For each projected monochromatic image component, the two reconfigurable HOEs of the stacks 82 and 90 that correspond to the color of the projected image component are selectively enabled to diffract the image component to the region 44. In a similar fashion, the reconfigurable HOE stacks 78 and 86, and the reconfigurable HOE stacks 80 and 88 operate in pairs to diffract color sets of image components to the regions 48 and 46, respectively.

The system 74 may also be modified to include the imaging devices 68 and 70. With the inclusion of the imaging devices, the system 74 can operate to update image segments to one or more regions 42–48 of the viewing screen 32 that is/are being observed by the viewer 72. The imaging devices of the system 74 would operate in the same manner as the imaging devices of the system 66.

Figure 6:
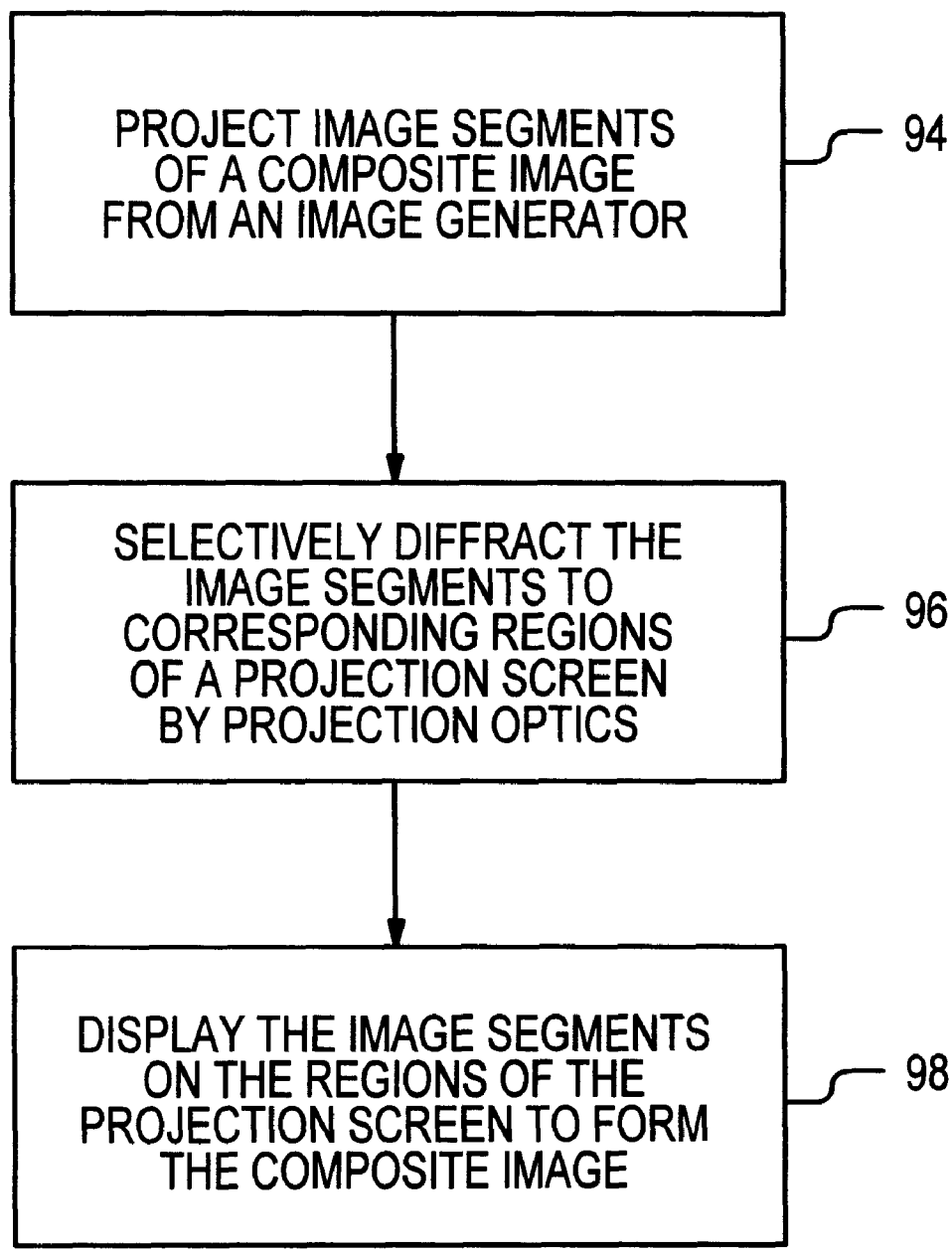
FIG. 6 is a flow diagram of a method of displaying a high resolution composite image on a projection screen in accordance with the invention.

A method of displaying a composite image on a screen of a projection system in accordance with the present invention will be described with reference to FIG. 6. At step 94, a number of image segments of the composite image are projected from an image generator of the projection system. Next, at step 96, the image segments are selectively diffracted to corresponding regions of the projection screen by reconfigurable HOEs of projection optics of the system. During step 96, the image segments may also be magnified by a predefined power by the reconfigurable HOEs of the projection optics. At step 98, the image segments are displayed on the corresponding regions of the projection screen to form the composite image. During steps 94–98, additional optical elements of conventional type may be used to assist in the correction of aberrations.

What is claimed is:

1. A projection system comprising:

image-generating means for projecting image segments of a composite image;

a display having a viewing surface; and image-manipulating means optically situated between said image-generating means and said display for selectively diffracting said image segments to sequentially direct said image segments among alternative predefined sections of said viewing surface, said sequential direction of said image segments being patterned to present said composite image on said viewing surface, said image-manipulating means including first and second reconfigurable holographic optical elements having controllable diffracted characteristics that are responsive to an applied electrical field, each of said first and second reconfigurable holographic optical elements being holographically configured to diffract a particular image segment to one of said predefined sections of said viewing surface when in a diffractive state.

2. The system of claim 1 wherein said image-manipulating means includes a third reconfigurable holographic optical element, said third reconfigurable holographic optical element being optically aligned with said first reconfigurable holographic optical element and being holographically configured to correct aberrations introduced by said first reconfigurable holographic optical element, said third reconfigurable holographic optical element having a controllable diffractive characteristic that is response to an applied electrical field.

3. The system of claim 1 wherein said first and second reconfigurable holographic optical elements are further holographically configured to magnify said particular image segment as said particular image is diffracted to said one of said predefined sections of said viewing surface.

4. The system of claim 1 wherein said first and second reconfigurable holographic optical elements are members of a plurality of reconfigurable holographic optical elements included in said image-manipulating means, each of said reconfigurable holographic optical elements being holographically configured to diffract a selected image segment of said image segments to a different section of said viewing surface of said display to form said composite image.

5. The system of claim 4 further comprising a voltage controller electrically coupled to said plurality of said reconfigurable holographic optical elements to selectively provide voltage to said reconfigurable holographic optical elements, said voltage provided by said voltage controller being sufficient to generate said applied electrical field.

6. The system of claim 4 wherein said plurality of reconfigurable holographic optical elements includes at least four reconfigurable holographic optical elements that are holographically configured to selectively diffract said image segments to quadrant-like sections of said viewing surface of said display.

7. The system of claim 4 further comprising a viewer imaging means for tracking an eye gaze direction of a viewer, said viewer imaging means being operatively coupled to said image-manipulating means to identify a particular image segment of said composite image that is to be updated, said particular image segment being identified based on said tracking of said eye gaze direction.

8. The system of claim 1 wherein each of said first and second reconfigurable holographic optical elements is holographically configured to optically manipulate monochromatic light such that said image segments are monochromatically displayed on said display when diffracted by said first and second reconfigurable holographic optical elements.

9. The system of claim 8 wherein each of said first and second reconfigurable holographic optical elements is one member of a set of three reconfigurable holographic optical elements, each of said three reconfigurable holographic optical elements being holographically configured to optically manipulate light of a particular tristimulus color when in said diffractive state.

10. A method of displaying a composite image on a screen of a projection system comprising steps of:

projecting first and second image segments of said composite image from an image generator;

diffracting said first and second image segments projected from said image generator to adjacent sections of said screen, including transmitting said first and second image segments through first and second reconfigurable holographic optical elements included in a projection optics of said system, said first and second reconfigurable holographic optical elements having optical characteristics that are controllable by an applied electrical field; and displaying said first and second image segments on said adjacent sections of said screen to form a portion of said composite image.

11. The method of claim 10 wherein said step of diffracting said first and second image segments includes magnifying said first image segment by a predefined magnification, said predefined magnification being dependent on said optical characteristic of said first reconfigurable holographic optical element.

12. The method of claim 10 further comprising a step of correcting aberrations introduced by said first reconfigurable holographic optical element by transmitting said first image segment through a third reconfigurable holographic optical element of said projection optics, said third reconfigurable holographic optical element having a controllable optical characteristic that is responsive to a second applied electrical field.

13. The method of claim 10 further comprising steps of:

projecting remaining image segments of said composite image from said image generator;

selectively diffracting said remaining image segments to different sections of said screen, including transmitting said remaining image segments through other reconfigurable holographic optical elements included in said projection optics of said system, each of said other reconfigurable holographic optical elements having a unique optical characteristic that is controllable by an electrical field; and displaying said remaining image segments on said screen to form said composite image.

14. The method of claim 13 further comprising steps of:

tracking an eye gaze direction of a viewer by imaging a pertinent portion of said viewer; and updating a particular image segment of said composite image displayed on said screen in response to said tracking of said eye gaze direction.

15. The method of claim 13 wherein said step of projecting said remaining image segments, said step of selectively diffracting said remaining image segments, and said step of displaying said remaining image segments are performed in a sequential manner such that a single image segment is projected, diffracted and displayed during a given period.

16. A projection system comprising:

an image generator that projects image segments of a composite image in a predetermined direction;

a display screen in optical communication with said image generator to receive and visually display said image segments projected from said image generator; and a projection optics positioned between said image generator and said display screen to selectively direct said image segments to different sections of said display screen to form said composite image on said display screen, said projection optics including a first reconfigurable holographic optical element having an optical characteristic that is controllable by an applied electrical field, said first reconfigurable holographic optical element being holographically configured to diffract a particular image segment to one of said different sections of said display screen when in a diffractive state.

17. The system of claim 16 wherein said first reconfigurable holographic optical element of said projection optics is further holographically configured to magnify said particular image segment by a defined power when said particular image segment is diffracted by said first reconfigurable holographic optical element.

18. The system of claim 16 further comprising a second reconfigurable holographic optical element included in said projection optics, said second reconfigurable holographic optical element being holographically configured to correct aberrations introduced by said first reconfigurable holographic optical element, said second reconfigurable holographic optical element having a controllable optical characteristic that is responsive to a second applied electrical field.

19. The system of claim 16 wherein said first reconfigurable holographic optical element is one member of a plurality of reconfigurable holographic optical elements included in said projection optics, each of said reconfigurable holographic optical elements being holographically configured to diffract at least one of said image segments to one of said different sections of said display screen.

20. The system of claim 19 further comprising a voltage controller electrically coupled to said reconfigurable holographic optical elements of said projection optics to selectively provide voltage to said reconfigurable holographic optical elements, said voltage provided by said voltage controller being sufficient to generate said applied electrical field.

21. The system of claim 19 including an imaging means for tracking an eye gaze direction of a viewer, said imaging means being operatively coupled to said reconfigurable holographic optical elements of said projection optics to selectively enable at least one of said reconfigurable holographic optical elements to said diffractive state based on said tracking of said eye gaze direction.

* * * * *